US007610541B2

(12) United States Patent
Tremaine et al.

(10) Patent No.: US 7,610,541 B2
(45) Date of Patent: Oct. 27, 2009

(54) COMPUTER COMPRESSED MEMORY SYSTEM AND METHOD FOR STORING AND RETRIEVING DATA IN A PROCESSING SYSTEM

(75) Inventors: Robert Brett Tremaine, Stormville, NY (US); Peter A. Franaszek, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 11/369,987

(22) Filed: Mar. 8, 2006

(65) Prior Publication Data
US 2007/0226428 A1 Sep. 27, 2007

(51) Int. Cl.
*G11C 29/00* (2006.01)
(52) U.S. Cl. ..................................... 714/763
(58) Field of Classification Search ............... 714/746, 714/763; 711/154, 165
See application file for complete search history.

(56) References Cited

U.S. PATENT DOCUMENTS

| | | | | |
|---|---|---|---|---|
| 6,092,171 A | * | 7/2000 | Relph | 711/203 |
| 7,047,382 B2 | * | 5/2006 | Geiger et al. | 711/165 |
| 2007/0157001 A1 | * | 7/2007 | Ritzau | 711/170 |

* cited by examiner

*Primary Examiner*—Shelly A Chase
(74) *Attorney, Agent, or Firm*—E. Dwayne Nelson, Es

(57) ABSTRACT

A computer compressed memory system for storing and retrieving data in a processing system, includes a memory including at least one memory device for storing at least one of uncompressed data and compressed data, a compressor for encoding data blocks into smaller compressed data blocks for storage in the memory, a decompressor for reconstituting encoded data into original uncompressed data blocks, a memory controller for generating, receiving and responding to memory access requests from processing and input/output units and responsively controlling access to the memory from the compressor and the decompressor for storing and retrieving data, and a hardware priority filter associated with the memory controller for selecting specific memory access requests according to attributes and access type within prescribed rates and under specific conditions.

17 Claims, 3 Drawing Sheets

COMPUTER COMPRESSED MEMORY SYSTEM AND METHOD FOR STORING AND RETRIEVING DATA IN A PROCESSING SYSTEM

This invention was made with Government support under Contact No. NBCH3039004 awarded by Defense Advanced Research Projects Agency (DARPA). The Government has certain rights in this invention.

BACKGROUND OF THE INVENTION

1. Field of the Invention

The present invention relates to a method and system for avoiding deadlock in compressed memory computing. More particularly, the present invention relates to a computer compressed memory system and method for storing and retrieving data in a processing system. The method and system of the present invention insures quality of service in memory systems in the presence of critical conditions, including power, thermal, compression induced memory pressure and real-time response.

2. Description of the Related Art

Compressed data memory systems used in computing environments have data stored either as compressed data or uncompressed data in a main memory, and generally as uncompressed data in at least one level of cache or a partition of the memory. Data is decompressed and compressed on demand, responsive to memory read and write access requests. The apparent size of real memory known to the operating system is generally larger than the amount of memory physically present in the system. The amount of the physical memory that is actually used by the computing environment is variable and depends on the effective level of data compression.

A condition known as "memory pressure" in systems of this type occurs when the runtime computing demands more memory than is physically available, generally because the data compression level has fallen below expectations and memory occupancy is high. The operating system software generally manages the dynamics of memory utility. However, if there is a rapid change in the overall level of compression, the condition may arise where the modified data in cache(s) cannot be written back into the memory given a cache fault. This is because changes in the data have affected the compression ratio, and data that once fit into the memory no longer does. The result is a processor deadlock.

Conventional systems and methods have addressed this issue with software to mitigate the condition, or eliminate the condition with extensive operating system software re-design. The conventional approaches can be effective, however, they require substantial support in the operating system. Thus, what is needed is a hardware solution that is independent of extensive or special operating system software to avoid deadlock conditions and insuring system quality of service.

SUMMARY OF THE INVENTION

In view of the foregoing and other exemplary problems, drawbacks, and disadvantages of the conventional methods and structures, an exemplary feature of the present invention is to provide a method and system for storing and retrieving data in a compressed memory computing system, while avoiding processor deadlock.

In accordance with a first exemplary aspect of the present invention, a computer compressed memory system for storing and retrieving data in a processing system, includes a memory including at least one memory device for storing at least one of uncompressed data and compressed data, a compressor for encoding data blocks into smaller compressed data blocks for storage in the memory, a decompressor for reconstituting encoded data into original uncompressed data blocks, a memory controller for generating, receiving and responding to memory access requests from processing and input/output units and responsively controlling access to the memory from the compressor and the decompressor for storing and retrieving data, and a hardware priority filter associated with the memory controller for selecting specific memory access requests according to attributes and access type within prescribed rates and under specific conditions.

In accordance with a second exemplary aspect of the present invention, a computer compressed memory system for storing and retrieving data in a processing system, includes a memory including at least one memory device for storing at least one of uncompressed data and compressed data, a compressor for encoding data blocks into smaller units for storage in the memory, a decompressor for reconstituting encoded data into original uncompressed data blocks, a memory controller for generating, receiving and responding to memory access requests from processing and input/output units and responsively controlling access to the memory from the compressor and the decompressor for storing and retrieving data, and a hardware priority filter associated with the memory controller for preferably selecting specific memory access requests according to attributes and access type within prescribed rates and under specific conditions. The hardware priority filter includes means for performing software configuration of the prescribed memory access rates, the specific conditions and the associated request attributes, means for measuring a reference rate by number of references per unit of time and by number of references per total number of references per unit time, and means for measuring memory consumption rate per the request attributes for responsively selecting priority associated with the request attributes when memory pressure conditions are present. The memory controller includes means for detecting when a critical memory condition is present by having exceeded a prescribed threshold and for forwarding data relating to the critical memory condition to the hardware priority filter, means for programming the prescribed threshold with a hysteresis, and means for detecting coherency conflicts between pending write requests and read requests between priority levels for having coherency requests services as a priority when a memory pressure condition is present and forwarding data related to the memory pressure condition to the hardware priority filter.

In accordance with a third exemplary aspect of the present invention, a method of regulating, with a hardware filter, memory access requests to insure quality of service during memory pressure, includes selecting memory access requests associated with at least one of a processor supervisor mode and other attributes associated with the memory access requests, selecting memory requests that do not increase memory pressure, selecting memory write requests with a coherency conflict with a pending memory access request, and selecting memory access requests with a delay timer reset.

The exemplary method and system of the present invention simplifies the required software support by adding hardware support by including new hardware features which provide the means to have multiple levels of priority access to the memory system. During periods of critical memory pressure, program processes critical to correct and continued system operation are permitted access to the system memory hierarchy, while lower priority processes are selectively slowed or suspended altogether. The operating system software, without being starved for memory resources itself, re-balance the runtime environment to mitigate the critical memory pressure condition, and re-establish normal process access to memory resources.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
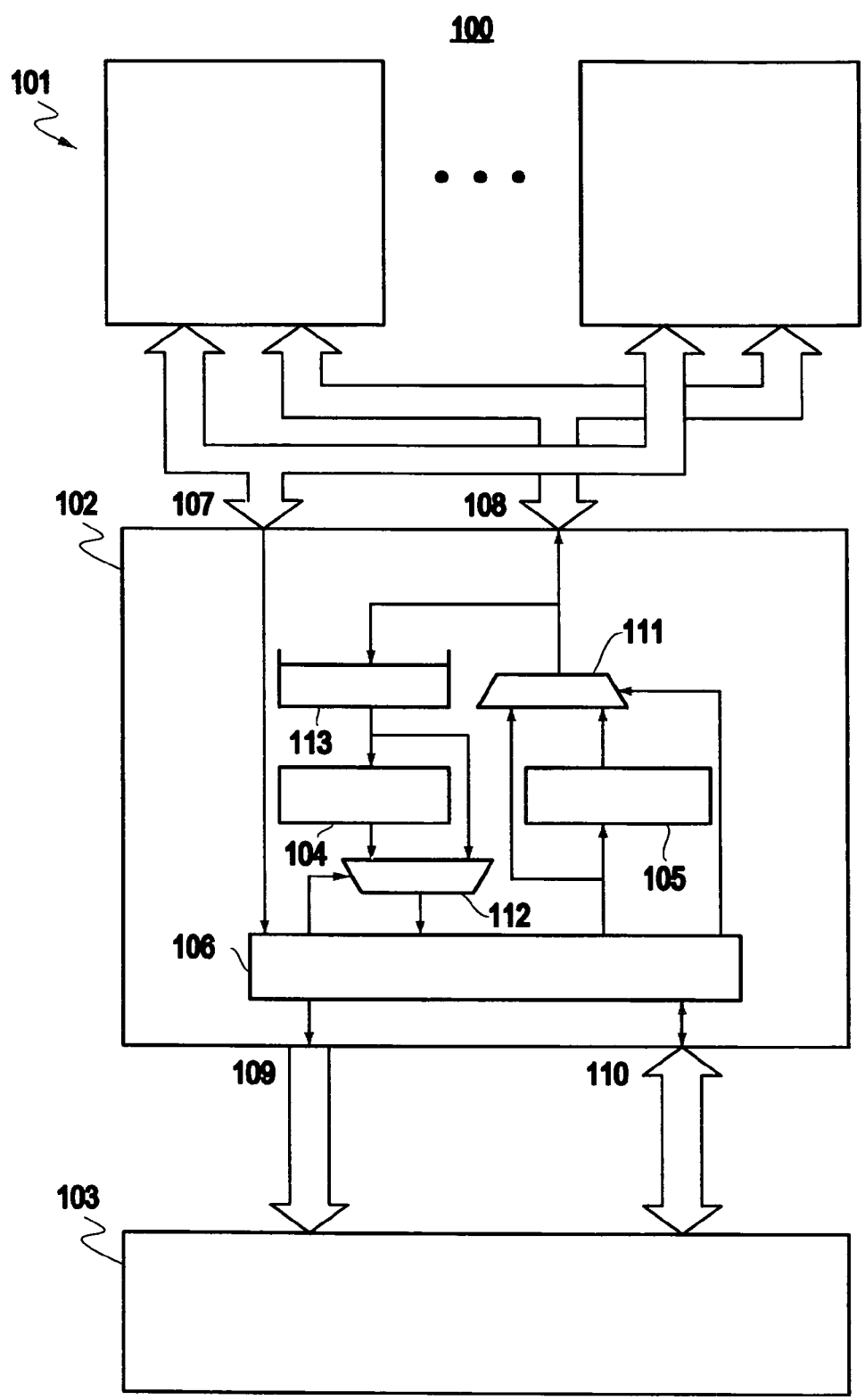
FIG. 1 illustrates a block diagram of a conventional computer system 100.
Figure 2:
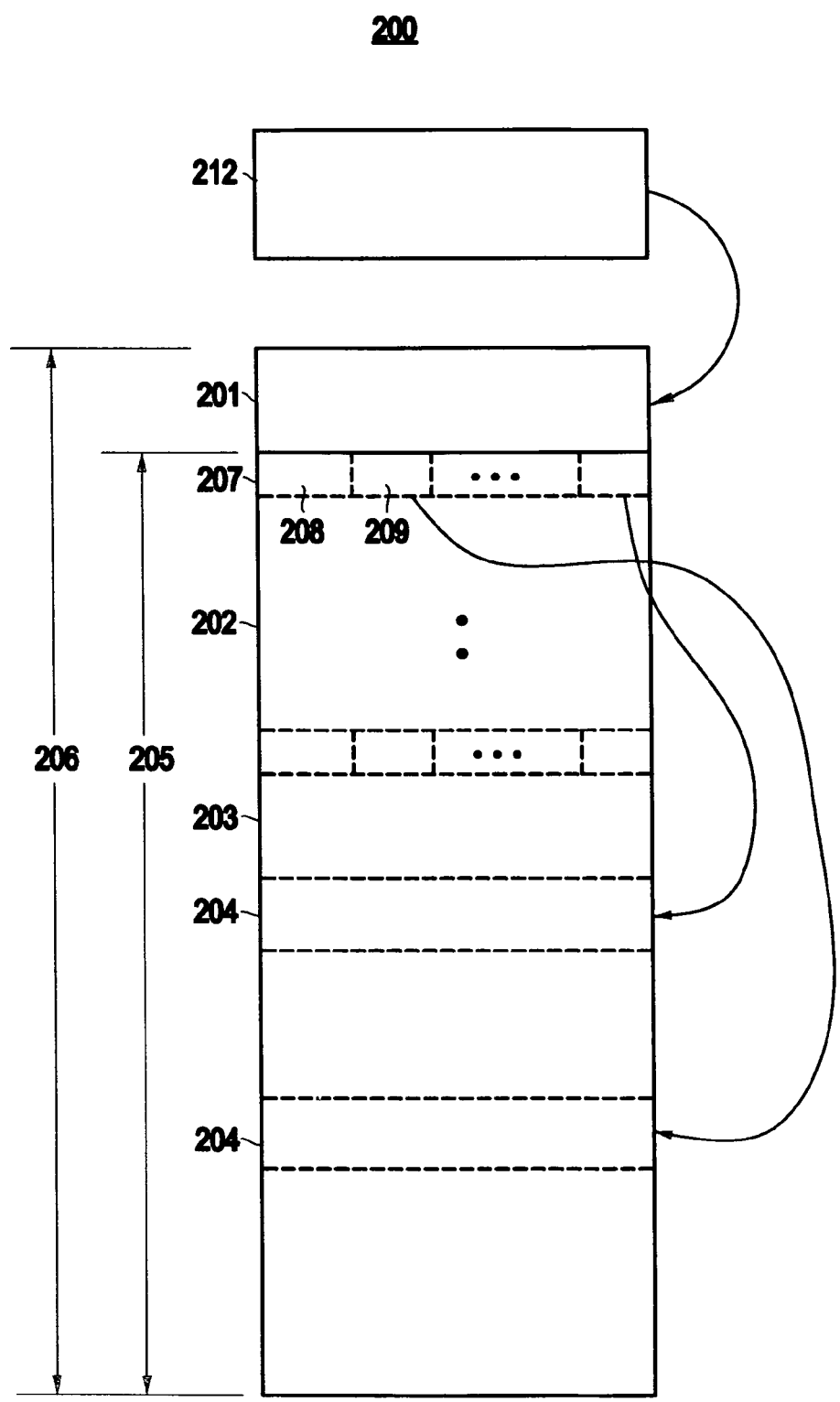
FIG. 2 illustrates a block diagram of a conventional system 200 for partitioning the main memory of the computer system 100 illustrated in FIG. 1.
Figure 3:
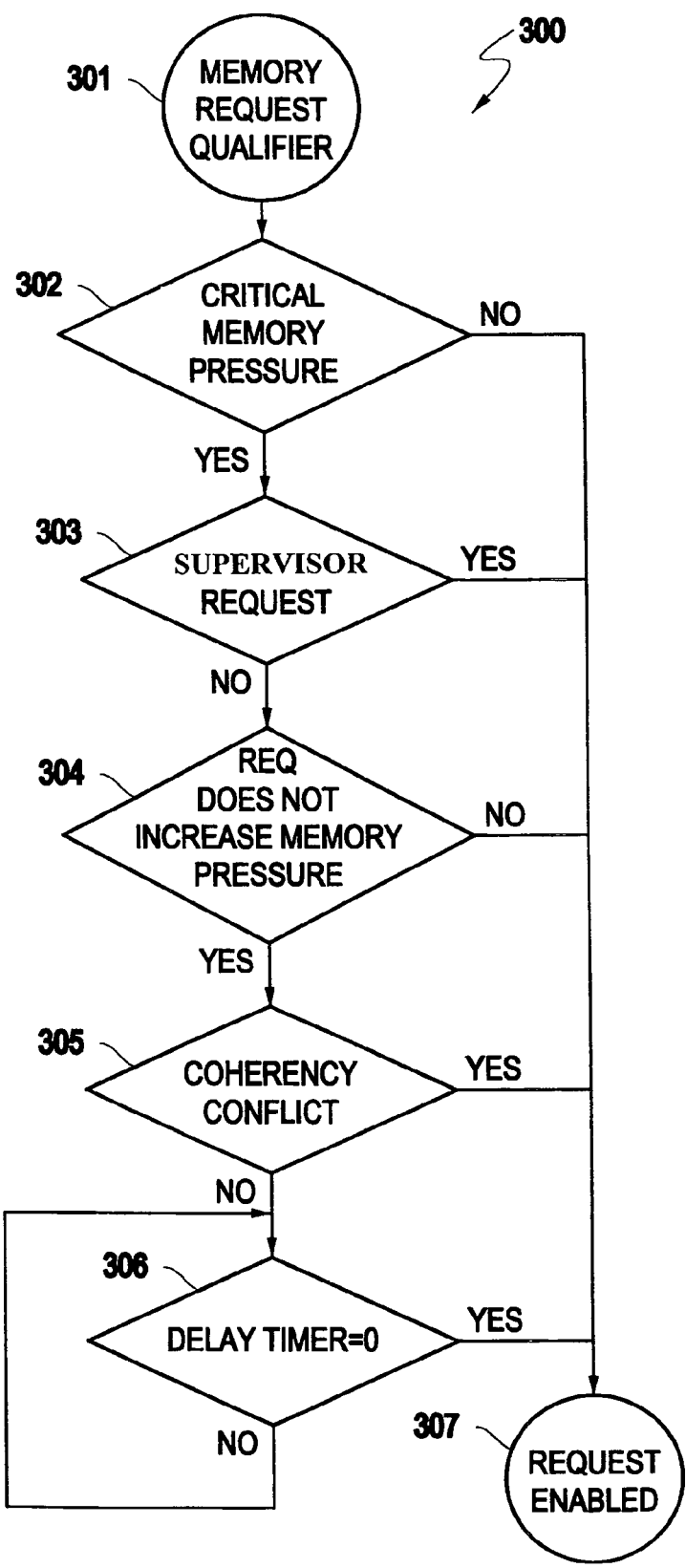
FIG. 3 illustrates a flow diagram for a method 300 of qualifying memory requests in accordance with an exemplary embodiment of the present invention.

Referring now to the drawings, and more particularly to FIGS. 1-3, there are shown exemplary embodiments of the method and structures according to the present invention.

Referring to FIG. 1, a block diagram of a conventional computer system 100 is shown. The computer system includes one or more processors 101 connected to a common shared memory controller 102 that provides access to a system main memory 103. The shared memory controller includes a compressor 104 for compressing fixed size information blocks into as small a unit as possible for ultimate storage into the main memory, a decompressor 105 for reversing the compression operation after the stored information is later retrieved from the main memory, and write queue 113 for queuing main memory store request information block(s) destined for the compressor. The processor data bus 108 is used for transporting uncompressed information between other processors and/or the shared memory controller. Information may be transferred to the processor data bus 108 from the main memory 103, either through or around the decompressor 105 via a multiplexor 111. Similarly, information may be transferred to the main memory 103 from the processor data bus 108 to the write queue 113 and then either through or around the compressor 104 via a multiplexor 112.

The main memory 103 is typically constructed of dynamic random access memory (DRAM) with access controlled by a memory controller 106. Scrub control hardware within the memory controller can periodically and sequentially read and write DRAM content through error detection and correction logic for the purpose of detecting and correcting bit errors that tend to accumulate in the DRAM. Addresses appearing on the processor address bus 107 are known as Real Addresses, and are understood and known to the programming environment. Addresses appearing on the main memory address bus 109 are known as Physical Addresses, and are used and relevant only between the memory controller and main memory DRAM. Memory Management Unit (MMU) hardware within the memory controller 106 is used to translate the real processor addresses to the virtual physical address space. This translation provides a means to allocate the physical memory in small increments for the purpose of efficiently storing and retrieving compressed and hence, variable size information.

The compressor 104 operates on a fixed size block of information (e.g., 1024 bytes) by locating and replacing repeated byte strings within the block with a pointer to the first instance of a given string, and encoding the result according to a protocol. This process occurs through a bytewise comparison over a fixed length and is paced by a sequence counter, resulting in a constant completion time. The post process output block ranges from just a few bytes to the original block size, when the compressor could not sufficiently reduce the starting block size to warrant compressing at all. The decompressor 105 functions by reversing the compressor operation by decoding a resultant compressor output block to reconstruct the original information block by inserting byte strings back into the block at the position indicated by the noted pointers. Even in the very best circumstances, the compressor is generally capable of only ¼-½ the data rate bandwidth of the surrounding system. The compression and decompression processes are naturally linear and serial too, implying quite lengthy memory access latencies through the hardware.

Lines in memory are accessed via the compression translation table (CTT), which indicates which sectors, if any, hold the line. This table essentially maps the relation between real memory as seen by the processor, and physical storage. If the line is all zeros, or in other special cases where compression is especially effective, no sectors need be allocated, with the required information for reconstructing the line held in the CAT. The system has a means for allocating sectors to compressed lines, and includes a count of the number of available or free sectors. Hardware continuously compares the number of free sectors to programmable threshold limits to alert the operating system software to memory pressure conditions.

Referring to FIG. 2, a conventional system for partitioning the main memory is shown 200. The main memory 205 is a logical entity because it includes the processor information as well as all the required data structures necessary to access the information. The logical main memory 205 is physically partitioned from the physical memory address space 206. In many cases, the main memory partition 205 may be smaller than the available physical memory to provide a separate region to serve as a cache with either an integral directory, or one that is implemented externally 212. It should be noted that when implemented, the cache storage may be implemented as a region 201 of the physical memory 206, a managed quantity of uncompressed sectors, or as a separate storage array. In any case, when implemented, the cache controller may request accesses to the main memory in a similar manner as a processor would if the cache were not present. Although it is typical for a large cache to be implemented between the processor(s) and the main memory for the highest performance, it is not required.

The logical main memory 205 may be partitioned into the sector translation table 202, with the remaining memory being allocated to sector storage 203, which may contain compressed data, uncompressed data, free sector pointers, or any other information as long as it is organized into sectors. The sector translation table region size 211 varies in proportion to the real address space size, which is defined by a programmable register within the system.

Each entry is directly mapped to a fixed address range in the processor's real address space. For example, a mapping may employ a 16 byte translation table entry to relocate a 1024 byte real addressed compression block, allocated as a quantity of 256 byte sectors, each located at the physical memory address indicated by a 25-bit pointer stored within the table entry. The entry may also contain attribute bits 208 that indicate the number of sector pointers that are valid, size of the sector pointers, and possibly other information. Every real address reference to the main memory causes the memory controller to reference the translation table entry 207 corresponding to the real address block containing the request address.

For read requests, the MMU decodes the attribute bits 208, extracts the valid pointer(s) 209 and requests the memory controller to read the information located at the indicated sectors 204 from the main memory sectored region 203. Similarly, write requests result in the MMU and memory controller performing the same actions, except information is written to the main memory. However, if a write request requires more sectors than are already valid in the translation table entry, then additional sectors need to be assigned to the table entry before the write may commence. Sectors are generally allocated from a list of unused sectors that is dynamically maintained as a stack or linked list of pointers stored in unused sectors.

There are many possible variations on this translation scheme, but all may involve a region of main memory mapped as a sector translation table and a region of memory mapped as sectors. Storage of these data structures in the DRAM based main memory provides the highest performance at the lowest cost, as well as ease of reverting the memory system into a typical direct mapped memory without compression and translation.

In accordance with one exemplary embodiment of the invention, the inventive system (and method) defines a hardware memory request qualifier, that includes the following system and method.

A set of programmable hardware registers is used to control the hardware filters with process parameters, including, but not limited to, processor id, process id, thread ID, and protection mode (user vs. supervisor), as well as associated prescribed access rates. Some parameters are optional (e.g., processor id, process id, and thread ID), but are defined to provide a higher level of specificity to the runtime environment filtering. The operating system maintains the register set as needed, updating during context switching or only after receiving low priority memory pressure threshold alerts.

Access requests to the compressed memory may be provided with additional signaling to transmit the process state to be compared against the pre-programmed filter parameters. A logical state or bit is defined in the conventional request queue to indicate when a request has been qualified by the filter. A request is only serviced from the queue(s) by the memory controller after the request is qualified, indicated by the logic state or bit associated by the request.

In accordance with an exemplary feature of the present invention, the system and method may define a new "free sector" threshold that is programmed to a value more critically beyond the limits already architected for conventional memory pressure alerts. A "critical memory pressure" event is generated when the available free sectors fall below the new threshold. Although higher free sector threshold limit events will have already generated interrupts to the software, these interrupts have not generated adequate service to the memory pressure condition, so this critical threshold event is also used to generate a non-maskable interrupt to the processors to facilitate the operating software to context switch to a memory page invalidate and rapid release of sectors to the free sector pool.

The critical memory pressure event may also be used to trigger hardware compressed memory access filters to begin restricting program access to the compressed memory system. The hardware filters are pre-programmed by the operating system to allocate a prescribed limited access rate to the compressed memory for user mode processes. The prescribed rates can vary between unrestricted to completely restricted, until the memory pressure condition is removed, the delay condition has been met, or a coherency dependency is detected between the request and another unrestricted request.

To regulate the rate for restricted requests, a set of associative hardware down counters are implemented. Restricted requests with the same attributes are serviced in order of receipt, and next inline for service is associated to a counter. The counter is initialized with the prescribed delay value when the request becomes the next inline for service. Any counter loaded with a non-zero value automatically counts down at the prescribed rate and stops at zero, where the delay restriction is only valid when the associated counter is not zero.

Alternatively or in addition to the delay count method, the request service rate may be regulated by other parameters, such as memory consumption rate, and reference rate with respect to requests with different attributes.

FIG. 3 illustrates a method 300 for qualifying memory requests with the hardware filter according to an exemplary embodiment of the claimed invention. Logically, a request is qualified 307 when no critical memory pressure condition exists 302, or the request is a supervisor mode request 303, or the request does not increase the memory pressure 304, or the request has a coherency conflict with another unrestricted request 305, or the delay timer is zero 306.

The invention described above relies on software process state to filter access to the compressed memory. An alternative method for filtering access to the compressed memory during critical memory pressure relies on process address space. This method employs the same threshold and filtering scheme describe earlier, but uses address ranges as the filtering criteria. The operating system software maintains the system memory allocation via page tables, and new information is defined and stored in the page table entries to provide the means for defining access priority to the compressed memory system. This information is carried through the page table buffers and is forwarded to the compressed memory system filters for comparison.

Certain programs (e.g., I/O routines, interrupt handlers) have special privileges, and can read or write data under all conditions of available memory (free sector counts). Other programs can only access data when the free sector count is sufficiently high. The special programs are distinguished, for example, by status bits in their page tables. Thus, the processor at any time is aware of the status of each instruction. This primary disadvantage of this method is the large overhead for having state carried throughout the page tables and buffers, as well as the granularity of controlling many disjoint address ranges for a single process.

Those skilled in the art will find that this invention can be used to regulate memory requests for conditions other than memory pressure, including, but not limited to, memory power management for critical thermal conditions, and for software compute thread priority of for real-time computing critical response time conditions.

A typical hardware configuration of an information handling/computer system in accordance with the invention preferably has at least one processor or central processing unit (CPU). The CPUs are interconnected via a system bus to a random access memory (RAM), read-only memory (ROM), input/output (I/O) adapter (for connecting peripheral devices such as disk units and tape drives to the bus), user interface adapter (for connecting a keyboard, mouse, speaker, microphone, and/or other user interface devices to the bus), communication adapter (for connecting an information handling system to a data processing network, the Internet, an Intranet, a personal area network (PAN), etc.), and a display adapter for connecting the bus to a display device and/or printer (e.g., a digital printer or the like).

In addition to the hardware and process environment described above, a different aspect of the invention includes a computer implemented method for storing and retrieving data in a processing system. As an example, this method may be implemented in the particular hardware environment discussed above.

Such a method may be implemented, for example, by operating a computer, as embodied by a digital data processing apparatus to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU and hardware described above, to perform the method of the present invention.

This signal-bearing media may include, for example, a RAM contained in a CPU, as represented by the fast-access storage, for example. Alternatively, the instructions may be contained in another signal-bearing media, such as a magnetic tape storage diskette or CD diskette, directly or indirectly accessible by the CPU.

Whether contained in a diskette, a computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM or EEPROM), an optical storage device (e.g., CD-ROM, WORM, DVD, digital optical tape, etc.), or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A computer compressed memory system for storing and retrieving data in a processing system, comprising:
   a memory comprising at least one optical storage memory device for storing at least one of uncompressed data and compressed data;
   a compressor for encoding data blocks into smaller units for storage in said memory;
   a decompressor for reconstituting encoded data into original uncompressed data blocks;
   a memory controller for generating, receiving and responding to memory access requests from processing and input/output units and responsively controlling access to said memory from said compressor and said decompressor for storing and retrieving data; and
   a hardware priority filter associated with said memory controller for preferably selecting specific memory access requests according to attributes and access type within prescribed rates and under specific conditions.

2. The system according to claim 1, wherein said memory access requests comprise at least a memory address, read or write type identification, and a request attribute.

3. The system according to claim 2, wherein said attributes comprise a processor identification, a process identification, a thread identification, a protection mode, an input/output device identification, and a software programmed identification.

4. The system according to claim 1, wherein said memory controller comprises:
   means for detecting when a critical memory condition is present by having exceeded a prescribed threshold and for forwarding data relating to said critical memory condition to said hardware priority filter.

5. The system according to claim 4, wherein said memory controller further comprises:
   means for programming said prescribed threshold with a hysteresis.

6. The system according to claim 4, wherein said memory controller further comprises:
   means for determining when said critical memory condition exceeds thermal requirements, power consumption requirements, compressed memory pressure requirements and real-time response latency requirements.

7. The system according to claim 1, further comprising:
   means for detecting coherency conflicts between pending write requests and read requests between priority levels for having coherency requests services as a priority when a memory pressure condition is present and forwarding data related to said memory pressure condition to said hardware priority filter.

8. The system according to claim 1, wherein said hardware priority filter comprises means for performing software configuration of said prescribed memory access rates, said specific conditions and said associated request attributes.

9. The system according to claim 1, wherein said hardware priority filter comprises means for measuring a reference rate by number of references per unit of time and by number of references per total number of references per unit time.

10. The system according to claim 1, wherein said hardware priority filter comprises means for measuring memory consumption rate per said request attributes for responsively selecting priority associated with said request attributes when memory pressure conditions are present.

11. A computer compressed memory system for storing and retrieving data in a processing system, comprising:
    a memory comprising at least one optical storage memory device for storing at least one of uncompressed data and compressed data;
    a compressor for encoding data blocks into smaller units for storage in said memory;
    a decompressor for reconstituting encoded data into original uncompressed data blocks;
    a memory controller for generating, receiving and responding to memory access requests from processing and input/output units and responsively controlling access to said memory from said compressor and said decompressor for storing and retrieving data; and
    a hardware priority filter associated with said memory controller for preferably selecting specific memory access requests according to attributes and access type within prescribed rates and under specific conditions, said hardware priority filter comprising:
       means for performing software configuration of said prescribed memory access rates, said specific conditions and said associated request attributes;

means for measuring a reference rate by number of references per unit of time and by number of references per total number of references per unit time; and means for measuring memory consumption rate per said request attributes for responsively selecting priority associated with said request attributes when memory pressure conditions are present, wherein said memory controller comprising:

means for detecting when a critical memory condition is present by having exceeded a prescribed threshold and for forwarding data relating to said critical memory condition to said hardware priority filter;

means for programming said prescribed threshold with a hysteresis; and means for detecting coherency conflicts between pending write requests and read requests between priority levels for having coherency requests services as a priority when a memory pressure condition is present and forwarding data related to said memory pressure condition to said hardware priority filter.

12. A computer-implemented method of regulating, with a hardware filter, memory access requests to insure quality of service during memory pressure, the computer comprising a processor for performing the method of regulating, the method comprising:

selecting memory access requests associated with at least one of a processor supervisor mode and other attributes associated with the memory access requests;

selecting memory requests that do not increase memory pressure;

selecting memory write requests with a coherency conflict with a pending memory access request; and selecting memory access requests with a delay timer reset.

13. The method according to claim 12, further comprising:

storing at least one of uncompressed data and compressed data in a memory comprising at least one memory device;

encoding, by use of a compressor, data blocks into smaller compressed data blocks for storage in said memory;

reconstituting, by use of a decompressor, encoded data into original uncompressed data blocks;

generating, receiving and responding to memory access requests from processing and input/output units and responsively controlling access to said memory from said compressor and said decompressor for storing and retrieving data; and selecting, through use of said hardware priority filter, specific memory access requests according to attributes and access type within prescribed rates and under specific conditions.

14. A computer memory system for storing and retrieving data in a processing system, comprising:

a memory comprising a plurality of optical storage memory devices for storing data;

a memory controller for generating, receiving and responding to memory access requests; and a hardware priority filter associated with said memory controller for preferably selecting specific memory access requests according to attributes and access type within prescribed memory access rates and under specific conditions.

15. The system according to claim 14, wherein said hardware priority filter comprises means for performing software configuration of said prescribed memory access rates, said specific conditions and said associated request attributes.

16. The system according to claim 14, wherein said hardware priority filter comprises means for measuring a reference rate by number of references per unit of time and by number of references per total number of references per unit time.

17. The system according to claim 14, wherein said hardware priority filter comprises means for measuring memory consumption rate per said request attributes for responsively selecting priority associated with said request attributes when memory pressure conditions are present.

* * * * *